United States Patent Office
3,181,061
Patented Apr. 27, 1965

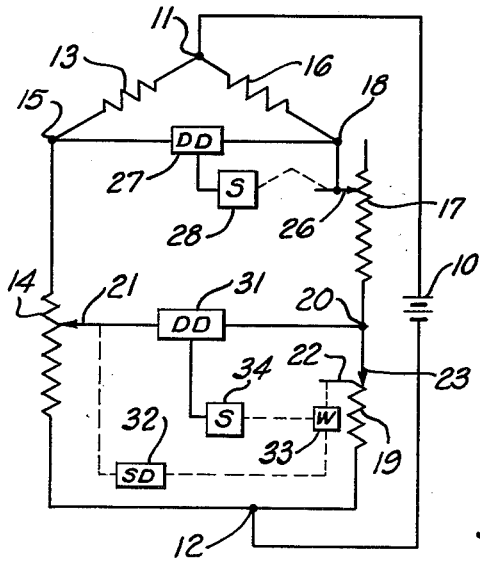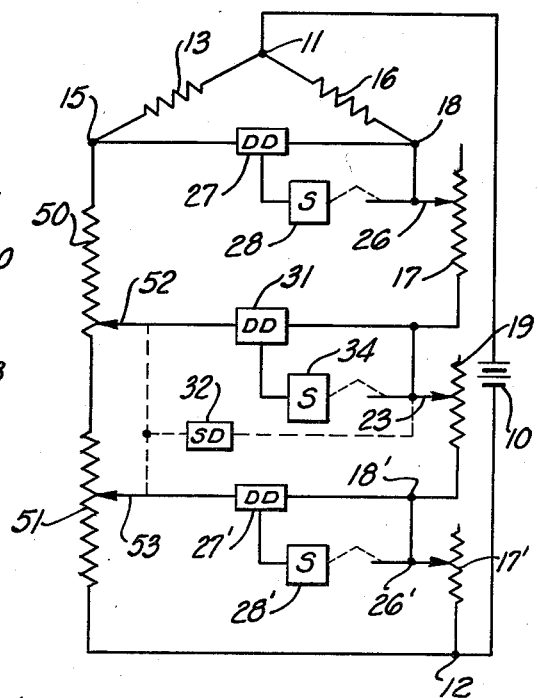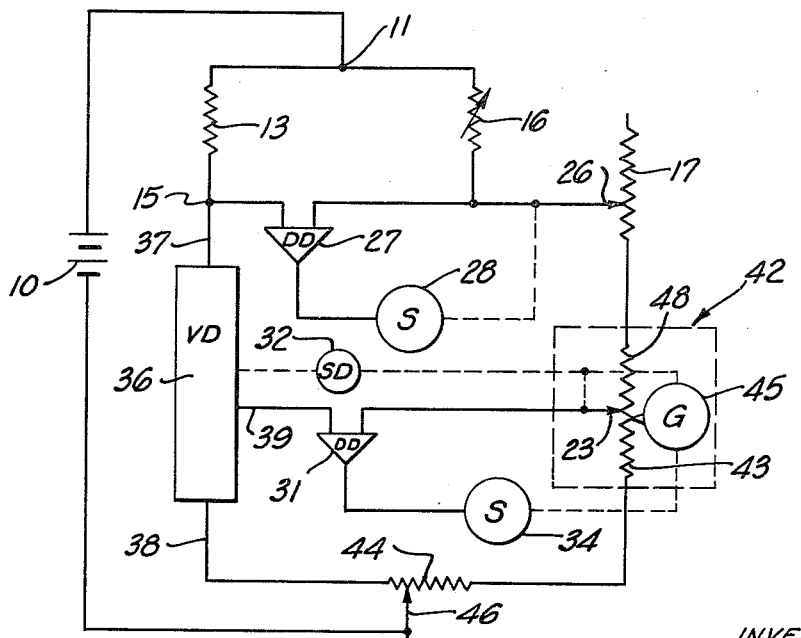

3,181,061
VARIABLE RESISTANCE COMPARISON CIRCUIT
Stanley Schneider, Costa Mesa, Calif., assignor to Beckman Instruments, Inc., a corporation of California
Filed Oct. 26, 1959, Ser. No. 848,601
10 Claims. (Cl. 324—62)

This invention relates to comparison circuits suitable for use in applications where one or more of the circuit elements are varying in value during the period in which the comparison is being made. The invention will be exemplified herein by the manufacture and test of electrical resistors; however, the invention is equally applicable to any field in which the aforesaid characteristics are present.

It is an object of the invention to provide a circuit for comparing the resistance characteristic of an unknown resistor with a standard though the total resistance of the unknown varies during the test run. A further object of the invention is to provide such a circuit in which the difference between the standard and unknown may be recorded to provide a ready reference. Another object of the invention is to provide such a circuit which may be used for continuous mathematical computations, such as summing, multiplication and division.

It is a further object of the invention to provide a circuit for comparing the characterstics of a resistor which is being formed to a standard. A further object is to provide such a circuit with means for controlling the forming of the resistor to cause the resistor to have the same characteristic as the standard. Another object of the invention is to provide such a circuit which may be used to compare a resistor which is being wound with a standard and to control the winding thereof as a function of the results of the comparison. A further object of the invention is to provide such a circuit with which a previously created resistor may be compared with a standard and in which the value of the previously created resistor may be changed by suitable means, such as by grinding away resistance material, to provide a continuous correlation between the resistance characteristics of the standard and the created resistor.

The over-all resistance of a resistor which is being formed varies during the forming operation. When a resistor is being wound, the total resistance increases continuously as additional turns are added, while the resistance characteristic is being controlled by varying the spacing of the turns. Similarly, the over-all resistance of a completed resistor changes when resistance material is either removed or added at particular spots along the resistor for varying the characteristic thereof. Because of this change in overall resistance, ordinary comparison circuits are not suitable for the applications referred to above. Accordingly, it is an object of the invention to provide a circuit having a difference detector which senses changes in the value of the unknown resistor or the resistor being formed and controls the value of the variable resistor in the circuit to compensate for said changes.

It is a further object of the invention to provide a comparison circuit suitable for any of the uses referred to above in which a plurality of standards may be combined to provide a single reference for comparison with the unknown resistor or the resistor being formed. In such a circuit, a plurality of standards, each having a relatively simple characteristic, may be used to control the forming of a resistor having a relatively complex characteristic. Also, such a circuit with a plurality of standards may be utilized in multiplying or dividing a plurality of numbers in the manner referred to previously. It is a further object of the invention to provide a comparison circuit utilizing a voltage divider as a standard in which the voltage divider may take any of a wide range of equivalent forms, such as a simple potentiometer, a Kelvin-Varley divider or a digital-to-analog computer output.

The invention also comprises novel details of construction and novel combinations and arrangements of elements, which will more fully appear in the course of the following description. The drawing merely shows and the description merely describes preferred embodiments of the present invention which are given by way of illustration or example.

In the drawings:
FIG. 1 is a schematic diagram of a preferred embodiment of the invention;
FIG. 2 is a schematic diagram of an alternative embodiment of the invention; and
FIG. 3 is a schematic diagram of another alternative embodiment.

Referring now to FIG. 1, a voltage source, which may be either A.C. or D.C., is shown as a battery 10 connected across terminals 11 and 12. A series circuit consisting of a resistor 13 serially connected to a potentiometer 14 at a junction 15 is connected between the terminals 11 and 12. Another series circuit, consisting of a resistor 16 serially connected to a variable resistor 17 at a junction 18 and a varying resistor 19 connected to the variable resistor 17 at a junction 20, is also connected between the terminals 11 and 12.

In the application to be described herebelow, the potentiometer 14 serves as the standard and functions as a voltage divider between the junction 15 and the terminal 12 providing a variable divided voltage at a potentiometer arm 21. The varying resistor 19 is the resistor being formed and, in this example, is being wound, the numeral 22 designating that portion of the resistance wire running from the spool of wire to the mandrel or core on which the resistor is being wound. A moving terminal 23 makes contact with the resistance wire at the last turn of the varying resistor 19 for connecting the resistor to the junction 20.

The variable resistor 17 may be any form of variable resistor and is shown herein as a potentiometer having one end of the resistance winding connected to the junction 20 and a movable arm 26 connected to the junction 18.

As the resistor 19 is wound, the resistance thereof increases and the resistance between the terminal 12 and the junction 18 would also normally increase. Such an increase in resistance tends to produce an unbalance in the circuit and means are provided for maintaining the resistance between the terminal 12 and the junction 18 constant, i.e., this portion of the circuit of the invention serves as a constant impedance generator. A difference detector or null detector 27 is connected between the junctions 15 and 18, the difference detector producing an output when there is a difference between the voltages at the junctions 15 and 18. This output of the difference detector is coupled to a servomechanism 28 which mechanically drives the arm 26 of the variable resistor 17 in response to the output of the difference detector to reduce the output to a minimum and maintain the resistance between the terminal 12 and junction 18 a constant. The resistance of the variable resistor 17 is varied inversely as the resistance of the varying resistor 19 and the former is referred to as the complement resistance. The resistance value of the series combination of the variable resistor 17 and the varying resistor 19 required to achieve this desired condition will depend upon the resistance values of the resistors 13 and 16 and the potentiometer 14. When the resistors 13 and 16 are equal in value, the series combination will be equal in value to the potentiometer and in general, the ratio of the resistance of the series combination to the resistance of the potentiometer 14 will be the same as the ratio to the resistor 16 to the resistor 13. The resistors 13 and 16 are ordinarily referred to as ratio resistors, since one or both may be adjusted in value to change the resistance ratio in the circuit.

Another difference detector or null detector 31 is coupled between the arm 21 of the voltage divider potentiometer 14 and the moving terminal 23 which contacts the varying resistor 19, the output of the difference detector being a function of the voltage appearing between the arm 21 and the terminal 23. Means are provided for driving the arm 21 along the potentiometer 14 and for winding the resistance wire 22 onto the mandrel to form the resistor 19 in synchronism, this means being indicated as a synchronous drive 32 mechanically coupled to the arm of the voltage divider and to a winding machine 33. The output of the difference detector 31 is coupled as the input to a servomechanism 34 which is also coupled to the winding machine to vary the spacing between the turns of the wire 22 as a function of the output of the difference detector. Hence, the winding machine 33 functions as a summing point with the drive 32 and the servomechanism 34 providing the inputs.

In the operation of the example of the invention shown in FIG. 1, the varying resistor 19 is wound from a continuous piece of the wire 22 onto a core, the winding machine being operated by the synchronous drive 32. When, for any reason, the resistance characteristic of the finished portion of the varying resistor 19 varies from the desired resistance characteristic as prescribed by the standard resistor 14, a voltage difference will exist between the arm 21 and the terminal 23. This voltage difference is detected by the difference detector 31 which produces an output driving the servomechanism 34 to change the spacing between the turns of the resistor being wound and thereby instantaneously correct the deviation of the resistance characteristic from the desired characteristic. As the over-all resistance of the varying resistor 19 increases, the over-all resistance of the variable resistor 17, which may be referred to as the complement resistor, is reduced by the operation of the difference detector 27 and servomechanism 28 to maintain the resistance between the terminal 12 and junction 18 a constant.

Thus it is seen that this circuit will correct for errors in the operation of the winding machine, in the resistance of the resistance wire itself, and other errors occurring during the winding of a resistor. Also the circuit may be used to wind resistors having characteristics other than that which may be produced by using the synchronous drive mechanism 32 alone, since the characteristic of the completed resistor is dependent upon the characteristic of the standard resistor 14 and not upon the characteristic of the synchronous drive.

In the comparison circuit of the invention, both of the servomechanisms 28, 34 drive their respective systems to the null or zero difference condition simultaneously and regardless of where the error appears in the circuit. Whether the error is in the magnitude of the resistor 19 or in the sum of the magnitudes of resistors 17 and 19, both servos will immediately drive to their respective zeros on introduction of the error.

Various modifications of this circuit may be made, depending upon the use to which it is to be put. For example, the servomechanism 34 may be omitted with the output of the difference detector 31 merely being recorded to give an indication of the deviation of the resistor being formed from the standard characteristic. Of course, the circuit just described may also be used to test or compare a finished resistor with a standard, the finished resistor being coupled in the circuit in the same manner as the varying resistor 19 with one end connected to the terminal 12 and the moving terminal 23 contacting the turns of the resistor. If the resistor being tested is a potentiometer with a self-contained sliding arm, the terminal 23 may be connected to the output of such an arm.

In another embodiment of the invention, the synchronous drive 32 may be omitted, the arm 21 of the voltage divider being moved manually or by other suitable means not related to the coil winding mechanism. Then the difference detector 31 and servomechanism 34 will supply the entire drive for the winding mechanism.

In the above examples, the voltage divider which supplies the standard has been described as a potentiometer. However, it is understood that any type of circuit which will provide an output which is a predetermined portion of an applied voltage will suffice and, in the embodiment of FIG. 2, that portion of the circuit corresponding to the potentiometer 14 of the embodiment of FIG. 1 is indicated as a voltage divider 36 having terminals 37 and 38 across which a voltage is applied and having a variable output arm 39. The voltage divider 36 may take various forms, such as a Kelvin-Varley divider, or a bank of fixed resistors with means for connecting the arm 39 to the junctions between the resistors, or similar circuitry. In the embodiment of FIG. 2, components which are identical to those utilized in the embodiment of FIG. 1 are identified by the same reference numerals.

A circuit for use in causing a previously manufactured resistor to conform to a prescribed resistance characteristic is shown in FIG. 2 wherein the resistance of the resistor being conformed is increased locally by grinding away resistance material. The grinding mechanism is shown diagrammatically at 42 where a resistor 43 is connected serially between the variable resistor 17 and one end of a balance potentiometer 44. The synchronous drive 32 moves the moving terminal 23 and a grinding head 45 along the resistor 43, the grinding head 45 being moved into engagement with the resistor 43 by the servomechanism 34 in response to the output from the difference detector 31. The balance potentiometer 44 is connected between the resistor 43 and the terminal 38 with an arm 46 of the potentiometer connected to the terminal 12 to permit elimination of any unbalance initially appearing in the circuit.

In another alternative form, the wire winding machine of FIG. 1 can be connected in the circuit as in FIG. 2. The resistor 17 can be fixedly connected to the end of the spool of resistance wire so that the junction 20 occurs at the point of contact of the moving terminal 23 with the resistance wire. Then the wire on the spool is in series with the resistor 17, between the junctions 18 and 20 and corresponds to the portion 48 of the resistor 43 of FIG. 2.

The accuracy of the results obtained by use of the comparison circuit of the invention is, of course, dependent upon the accuracy of the various components therein and upon the response time of the servomechanisms. However, it is noted that the deleterious effects of errors and time delays in the difference detector 27 and the servomechanism 28 become less as the resistance value of the resistor 16 is increased relative to that of the resistors 17, 19 and 43.

It is possible to compare and/or form a resistor with more than one standard by using an embodiment of the circuit of the invention, such as that shown in FIG. 3, wherein two or more standards and two or more complement resistors are utilized. In the example given in FIG. 3, two standards indicated as voltage dividing potentiometers 50 and 51, are provided. However, additional standards could be utilized by connecting additional voltage dividers in series with the voltage dividers 50, 51 and including corresponding additional complement resistors, difference detectors and servomechanisms. A difference detector 27' is connected between a variable divided voltage arm 53 of the potentiometer 51 and a junction 18' between the varying resistor 19 and a variable resistor 17', this difference detector 27' corresponding in design and function to the difference detector 27.

The resistance of the variable resistor 17' is controlled by movement of a movable arm 26' driven by a servomechanism 28' which is actuated by the output of the difference detector 27'.

The difference detector 31 is connected between an arm 52 of the voltage divider potentiometer 50 and the moving terminal 23 which contacts the resistor 19. The drive 32 may be coupled to the arms 52, 53 and terminal 23 for controlling their relative positions. If the varying resistor 19 of FIG. 3 is being wound as in the embodiment of FIG. 1, the characteristic thereof will be a function of the characteristics of the two standards 50, 51.

Any of the above described embodiments of the invention may be used as a computer if desired. Referring to FIG. 3, separate drives for the variable arms 52 and 53 may be substituted for the drive 32, with the terminal 23 being actuated only by the servomechanism 34. As the voltages at the arms 52 and 53 vary, representing two variables, the servomechanism 34 will move the terminal 23 along the resistor 19 to produce a null or minimum voltage at the difference detector 31. The output of the servomechanism represents the result of the computation performed, in this example, a summing operation.

An additional variable may be injected into the forming or computing operations of the circuit by varying the value of one or both of the ratio resistors 13, 16 either with the synchronous drive or independent thereof. The resultant resistor or computation answer will then be a function of this variation in ratio also, variation of a ratio resistor providing a multiplying operation.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. A circuit for comparing the resistance of a standard resistance with the resistance of a unit whose resistance varies during the comparison, the circuit being operable from an electrical voltage source, the circuit including in combination: a first series circuit; means for coupling said first series circuit across said voltage source, said first series circuit comprising a first ratio resistance unit and a voltage divider unit serially connected at a first junction, said voltage divider unit having a variable divided voltage arm for providing a voltage that is a portion of the voltage connected to the ends of said voltage divider unit; a second series circuit comprising a complement resistance unit and means for serially connecting the unit whose resistance varies during the comparison to said complement resistance unit at a second junction to form a series combination, and a second ratio resistance unit serially connected to said series combination at a third junction, said complement resistance unit including means for varying the value thereof; means for coupling said second series circuit across said voltage source in parallel with said first series circuit; a movable point on the unit whose resistance varies during the comparison; a first difference detector coupled between said first and third junctions for producing an output which is a function of any voltage difference existing between said first and third junctions; control means actuated by said output of said first difference detector and coupled in driving relationship to said means for varying said complement resistance unit to maintain said output at a minimum; and a second difference detector coupled between said movable point and said variable divided voltage arm for producing an output which is a function of any voltage difference existing between said variable divided voltage arm and said movable point.

2. A circuit for comparing the resistance of a standard resistance with the resistance of a unit whose resistance varies during the comparison, the circuit being operable from an electrical voltage source, the circuit including in combination: a first series circuit; means for coupling said first series circuit across said voltage source, said first series circuit comprising a first ratio resistance unit and a voltage divider unit serially connected at a first junction, said voltage divider unit having a variable divided voltage arm for providing a voltage that is a portion of the voltage connected to the ends of said voltage divider unit; a second series circuit comprising a complement resistance unit and means for serially connecting the unit whose resistance varies during the comparison to said complement resistance unit at a second junction to form a series combination, and a second ratio resistance unit serially connected to said series combination at a third junction, said complement resistance unit including means for varying the value thereof; means for coupling said second series circuit across said voltage source in parallel with said first series circuit; a movable point on the unit whose resistance varies during the comparison; a first difference detector coupled between said first and third junctions for producing an output which is a function of any voltage difference existing between said first and third junctions; control means actuated by said output of said first difference detector and coupled in drive relationship to said means for varying said complement resistance unit to maintain said output at a minimum; a second difference detector coupled between said movable point and said variable divided voltage arm for producing an output which is a function of any voltage difference existing between said variable divided voltage arm and said movable point; and means for varying the voltage appearing at said variable divided voltage arm and simultaneously moving the movable point along the unit whose resistance varies during the comparison.

3. In an apparatus for winding a resistor having a prescribed resistance characteristic, the combination of: an electrical voltage source; a first series circuit; means for coupling said first series circuit across said voltage source, said first series circuit comprising a first ratio resistance unit and means for serially connecting a voltage divider unit to said first ratio resistance unit at a first junction, said means including a variable divided voltage arm connecting to the voltage divider unit for providing a voltage that is a portion of a voltage connected to the ends of the voltage divider unit; a second series circuit; means for coupling said second series circuit across said voltage source, said second series circuit comprising a complement resistance unit and a length of resistance wire being wound to form said resistor having a prescribed characteristic, and a second ratio resistance unit serially connected to said series combination at a third junction, said complement resistance unit including means for varying the value thereof, said length of resistance wire having contact means contacting said wire at the point at which it is being wound; a first difference detector coupled between said first and third junctions for producing an output which is a function of any voltage difference existing between said first and third junctions; control means actuated by said output of said first difference detector and coupled in driving relationship to said means for varying said complement resistance unit to maintain said output at a minimum; and a second difference detector coupled between said contact means and said variable divided voltage arm for producing an output which is a function of any voltage difference existing between said variable divided voltage arm and said contact means.

4. A circuit for comparing the resistance of a standard resistance with the resistance of a unit whose resistance varies during the comparison, the circuit being operable from an electrical voltage source, the circuit including in combination; a first series circuit; means for coupling said first series circuit across said voltage source, said first series circuit comprising a first ratio resistance unit and a voltage divider unit serially connected at a first junction, said voltage divider unit having a variable divided voltage arm for providing a voltage that is a portion of the voltage connected to the ends of said voltage divider unit; a second series circuit comprising a complement resistance unit and means for serially connecting the unit whose resistance varies during the comparison to said complement resistance unit at a second junction to form a series combination, and a second ratio resistance unit serially connected to said series combination at a third junction, said complement resistance unit including means for varying the value thereof; means for coupling said second series circuit across said voltage source in parallel with said first series circuit; a movable point on the unit whose resistance varies during the comparison; a first difference detector coupled between said first and third junctions for producing an output which is a function of any voltage difference existing between said first and third junctions; conrol means actuated by said output of said first difference detector and coupled in driving relationship to said means for varying said complement resistance unit to maintain said output at a minimum; a second difference detector coupled between said movable point and said variable divided voltage arm for producing an output which is a function of any voltage difference existing between said variable divided voltage arm and said movable point; means for varying the voltage appearing at said variable divided voltage arm and simultaneously moving the movable point along the unit whose resistance varies during the comparison; and means for connecting said output of said second difference detector to a recorder to record said output as a function of said movement of the movable point.

5. In an apparatus for forming a resistor having a prescribed resistance characteristic, the combination of: an electrical voltage source; a first series circuit coupled across said voltage source, said first series circuit comprising a first ratio resistance unit and a voltage divider unit serially connected at a first junction, said voltage divider unit having a variable divided voltage arm for providing a voltage that is a portion of the voltage connected to the ends of said voltage divider unit; a second series circuit coupled across said voltage source is parallel with said first series circuit, said second series circuit comprising a complement resistance unit and means for serially connecting the resistor being formed to said complement resistance unit at a second junction to make up a series combination, and a second ratio resistance unit serially connected to said series combination at a third junction, said complement resistance unit including means for varying the value thereof; contact means for contacting a point on the resistor being formed; a first difference detector coupled between said first and third junctions for producing an output which is a function of any voltage difference existing between said first and third junctions; first control means actuated by said output of said first difference detector and coupled in driving relationship to said means for varying said complement resistance unit to maintain said output at a minimum; a second difference detector coupled between said contact means and said variable divided voltage arm for producing an output which is a function of any voltage difference existing between said variable divided voltage arm and said contact means; means for forming the resistor to vary the resistance thereof adjacent the point being contacted by said contact means; second control means actuated by said output of said second difference detector and coupled in driving relationship to said means for forming the resistor to maintain said output at a minimum; and means for simultaneously varying the voltage appearing at said variable divided voltage arm and moving said contact means along the resistor being formed and moving said means for forming the resistor along the resistor.

6. In an apparatus for winding a resistor having a prescribed resistance characteristics, the combination of: an electrical voltage source; a first series circuit coupled across said voltage source, said first series circuit comprising a first ratio resistance unit and a voltage divider unit serially connected at a first junction, said voltage divider unit having a variable divided voltage arm for providing a voltage that is a portion of the voltage connected to the ends of said voltage divider unit; a second series circuit coupled across said voltage source in parallel with said first series circuit, said second series circuit comprising a complement resistance unit and means for serially connecting the resistor being wound to said complement resistance unit at a second junction to make up a series combination, and a second ratio resistance unit serially connected to said series combination at a third junction, said complement resistance unit including means for varying the value thereof; contact means for contacting a point on the resistor being wound; a first difference detector coupled between said first and third junctions for producing an output which is a function of any voltage difference existing between said first and third junctions; first control means actuated by said output of said first difference detector and coupled in driving relationship to said means for varying said complement resistance unit to maintain said output at a minimum; a second difference detector coupled between said contact means and said variable divided voltage arm for producing an output which is a function of any voltage difference existing between said variable divided voltage arm and said contact means; means for winding the resistor on a core including means for varying the spacing between turns of the resistor as the resistor is wound to vary the resistance thereof adjacent the point being contacted by said contact means; second control means actuated by said output of said second difference detector and coupled in driving relationship to said means for varying the spacing to maintain said output at a minimum; and means for simultaneously varying the voltage appearing at said variable divided voltage arm and moving said contact means along the resistor being wound and moving said means for winding the resistor along the core.

7. In an apparatus for changing the resistance of a resistor to conform to a prescribed characteristic, the combination of: an electrical voltage source; a first series circuit coupled across said voltage source, said first series circuit comprising a first ratio resistance unit and a voltage divider unit serially connected at a first junction, said voltage divider unit having a variable divided voltage arm for providing a voltage that is a portion of the voltage connected to the ends of said voltage divider unit; a second series circuit coupled across said voltage source in parallel with said first series circuit, said second series circuit comprising a complement resistance unit and means for serially connecting the resistor being changed to said complement resistance unit at a second junction to make up a series combination, and a second ratio resistance unit serially connected to said series combination at a third junction, said complement resistance unit including means for varying the value thereof; contact means for contacting a point on the resistor being changed; a first difference detector coupled between said first and third junctions for producing an output which is a function of any voltage difference existing between said first and third junctions; first control means actuated by said output of said first difference detector and coupled in driving relationship to said means for varying said complement resistance unit to maintain said output at a minimum; a second difference detector coupled between said contact means and said variable divided voltage arm for producing an output which is a function of any voltage difference existing between said variable divided voltage arm and said contact means; means for removing resistance material from the resistor to vary the resistance thereof adjacent the point being contacted by said contact means; second control means actuated by said output of said second difference detector and coupled in driving relationship to said means for removing resistance material to maintain said output at a minimum; and means for simultaneously varying the voltage appearing at said variable divided voltage arm and moving said contact means along the resistor being changed and moving said means for removing resistance material along the resistor being changed.

8. A circuit for comparing the resistance of a standard resistance with the resistance of a unit whose resistance varies during the comparison, the circuit being operable from an electrical voltage source, the circuit including in combination: a first series circuit; means for coupling said first series circuit across said voltage source, said first series circuit comprising a first ratio resistance unit and a plurality of voltage divider units serially connected, said first ratio resistance unit being at one end of said first series circuit and connected to the adjacent voltage divider unit at a first junction, each of said voltage divider units having a variable divided voltage arm for providing a voltage that is a portion of the voltage connected to the ends of said voltage divider unit; a second series circuit comprising a plurality of complement resistance units and means for serially connecting the unit whose resistance varies during the comparison to said complement resistance units to form a series combination, and a second ratio resistance unit serially connected to said series combination at a second junction, each of said complement resistance units including means for varying the resistance value appearing at a terminal thereof; means for coupling said second series circuit across said voltage source in parallel with said first series circuit; a movable point on the unit whose resistance varies during the comparison; a first difference detector coupled between said first and second junctions for producing an output which is a function of any voltage difference existing between said first and second junctions; first control means actuated by said output of said first difference detector and coupled in driving relationship to the means for varying one of said complement resistance units to maintain said output at a minimum; a second difference detector coupled between said movable point and one of said variable divided voltage arms for producing an output which is a function of any voltage difference existing between said variable divided voltage arm and said movable point; a plurality of additional difference detectors, each coupled between the terminal of another of said complement resistance units and another of said variable divided voltage arms respectively for producing an output which is a function of any voltage difference existing between said terminal and arm; and a plurality of additional control means, each actuated by the output of one of said additional difference detectors respectively, and each coupled in driving relationship to the means for varying the corresponding complement resistance unit to maintain each of the outputs at a minimum.

9. In a comparison circuit, the combination of: a voltage source; a first controlled variable resistor; a second controlled variable resistor; means for coupling said second controlled variable resistor into the circuit in series with said first controlled variable resistor, said means including a variable output for said second controlled variable resistor; a standard resistance means having a variable output; a first ratio resistor serially connected to said controlled variable resistors; means coupling said voltage source across the series circuit comprising said first ratio resistor and said controlled variable resistors; a second ratio resistor serially connected to said standard resistance means; means coupling said voltage source across the series circuit comprising said second ratio resistor and said standard resistance means; means for controlling the resistance of said first controlled variable resistor; a first null detector coupled between the ends of said ratio resistors which are remote from said voltage source; means for coupling the output of said first null detector to said means for controlling the resistance of said first controlled variable resistor; and a second null detector coupled between said variable outputs.

10. A circuit for comparing the resistance of a standard resistance with the resistance of a unit whose resistance varies during the comparison including the combination of: a first circuit including said standard resistance, a second circuit including a variable resistance element in series with the unit whose resistance varies during the comparison, means for electrically energizing said first and second circuits, first means coupled between said first and second circuits for detecting changes in voltage between predetermined points of said first and second circuits, second means coupled between said first means and said variable resistance element for changing the resistance thereof inversely to a resistance change of the unit whose resistance varies during the comparison, and third means coupled between said first and second circuits for comparing the voltage at a selected point of said standard resistance with the voltage at a selected point of the unit whose resistance varies during the comparison.

References Cited by the Examiner
UNITED STATES PATENTS

| | | | |
|---|---|---|---|
| 2,500,605 | 3/50 | De Lange et al. | 324—62 X |
| 2,618,440 | 11/52 | Scott et al. | 242—9 |
| 2,639,411 | 5/53 | Schafer | 318—19 |
| 2,712,172 | 7/55 | Bayha | 51—282 |
| 2,773,332 | 12/56 | Buchman et al. | 51—282 |
| 2,989,256 | 6/61 | Lee | 324—62 X |

References Cited by the Applicant
UNITED STATES PATENTS

| | | |
|---|---|---|
| 1,086,729 | 2/14 | Rey. |
| 2,883,618 | 4/59 | Nuut. |
| 3,085,194 | 4/63 | Revesz. |

WALTER L. CARLSON, *Primary Examiner.*

SAMUEL BERNSTEIN, LLOYD McCOLLUM,
*Examiners.*